US012597534B2

(12) United States Patent
Fukuoka et al.

(10) Patent No.: US 12,597,534 B2
(45) Date of Patent: Apr. 7, 2026

(54) COPPER STRIP FOR EDGEWISE BENDING, COMPONENT FOR ELECTRIC OR ELECTRONIC DEVICE, AND BUS BAR

(71) Applicant: MITSUBISHI MATERIALS CORPORATION, Tokyo (JP)

(72) Inventors: Kosei Fukuoka, Kitamoto (JP); Yuki Ito, Kitamoto (JP); Kenichiro Kawasaki, Kitamoto (JP); Kazunari Maki, Kitamoto (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 82 days.

(21) Appl. No.: 18/573,323

(22) PCT Filed: Jul. 4, 2022

(86) PCT No.: PCT/JP2022/026578
§ 371 (c)(1),
(2) Date: Dec. 21, 2023

(87) PCT Pub. No.: WO2023/277199
PCT Pub. Date: Jan. 5, 2023

(65) Prior Publication Data

US 2024/0371543 A1 Nov. 7, 2024

(30) Foreign Application Priority Data

Jul. 2, 2021 (JP) ................................ 2021-110693
Mar. 31, 2022 (JP) ................................ 2022-060502
Jul. 1, 2022 (JP) ................................ 2022-106847

(51) Int. Cl.
*H01B 5/02* (2006.01)
*H01B 1/02* (2006.01)
(Continued)

(52) U.S. Cl.
CPC ............... *H01B 5/02* (2013.01); *H01B 1/026* (2013.01); *H01B 7/0018* (2013.01); *H01B 7/2806* (2013.01)

(58) Field of Classification Search
None
See application file for complete search history.

(56) References Cited

U.S. PATENT DOCUMENTS 5,160,274 A * 11/1992 Ozaki .................. H01R 9/2458 439/724
6,325,640 B1 * 12/2001 Kasai .................. H01R 25/168 439/949
(Continued)

FOREIGN PATENT DOCUMENTS

EP 3896179 A1 10/2021
JP 54066404 A 5/1979
(Continued)

OTHER PUBLICATIONS

International Search Report mailed Aug. 9, 2022 for the corresponding International Patent Application No. PCT/JP2022/026578 (4 pages including English translation).
(Continued)

*Primary Examiner* — Seth Dumbris
(74) *Attorney, Agent, or Firm* — Leason Ellis LLP; Melvin C. Garner; Mitsuhiro Haraguchi

(57) ABSTRACT

A copper strip for edgewise bending can be edgewise-bent under a condition that a ratio R/W of a bending radius R to a width W is 5.0 or less. In the copper strip, a thickness t is in a range of 1 mm or more and 10 mm or less, and area ratio B/(A+B) is in a range of more than 10% and 100% or less in a square region where the length of one side is 1/10 of the thickness t, where an intersection of a straight line which contacts a surface and is parallel to a width direction and a straight line which contacts an end face and is perpendicular
(Continued)

to the width direction is used as a reference in a cross section orthogonal to a longitudinal direction, A is an area where copper is present, and B is an area where copper is not present.

13 Claims, 4 Drawing Sheets

(51) Int. Cl.

*H01B 7/00* (2006.01)
*H01B 7/28* (2006.01)

(56) References Cited

U.S. PATENT DOCUMENTS

| | | | | |
|---|---|---|---|---|
| 2002/0108685 | A1* | 8/2002 | Hatakeyama | C22F 1/08 148/684 |
| 2021/0002743 | A1* | 1/2021 | Matsunaga | C22C 9/00 |
| 2022/0025486 | A1* | 1/2022 | Ito | C04B 37/021 |
| 2022/0403484 | A1 | 12/2022 | Mori et al. | |

FOREIGN PATENT DOCUMENTS

| | | | | |
|---|---|---|---|---|
| JP | 2012195212 | A | 10/2012 | |
| JP | 2013004444 | A | 1/2013 | |
| JP | 5588384 | B2 | 9/2014 | |
| WO | WO-2019189558 | A1 * | 10/2019 | H01B 5/02 |
| WO | 2020122230 | A1 | 6/2020 | |
| WO | WO-2020122112 | A1 * | 6/2020 | C04B 37/021 |
| WO | 2021060023 | A1 | 4/2021 | |
| WO | 2022085718 | A1 | 4/2022 | |
| WO | 2022085723 | A1 | 4/2022 | |

OTHER PUBLICATIONS

European Search Report mailed Dec. 4, 2025 for the corresponding European Patent Application No. 22833343.1: Total 10 pages.

* cited by examiner

[FIG. 1A]
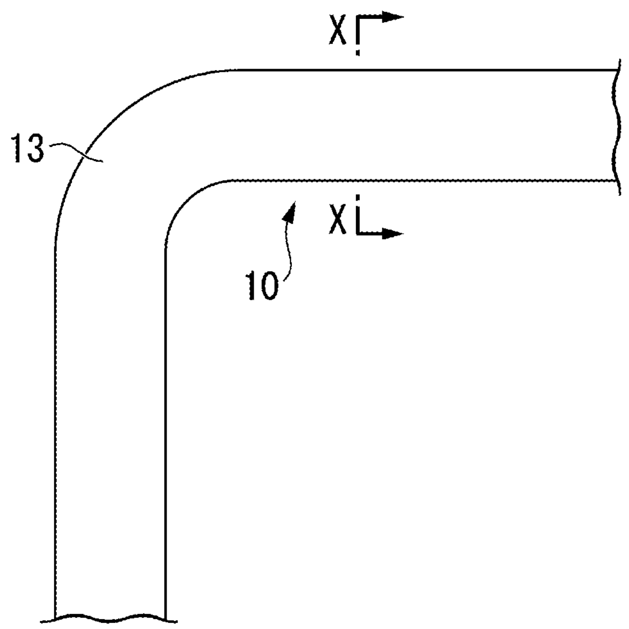
[FIG. 1B]
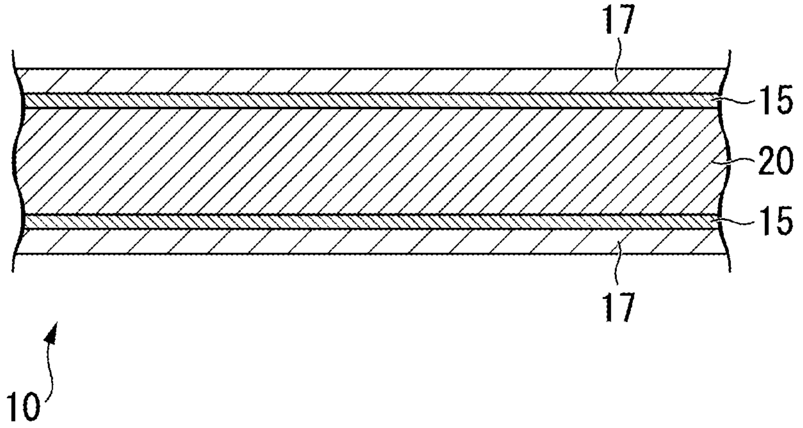

[FIG. 2]
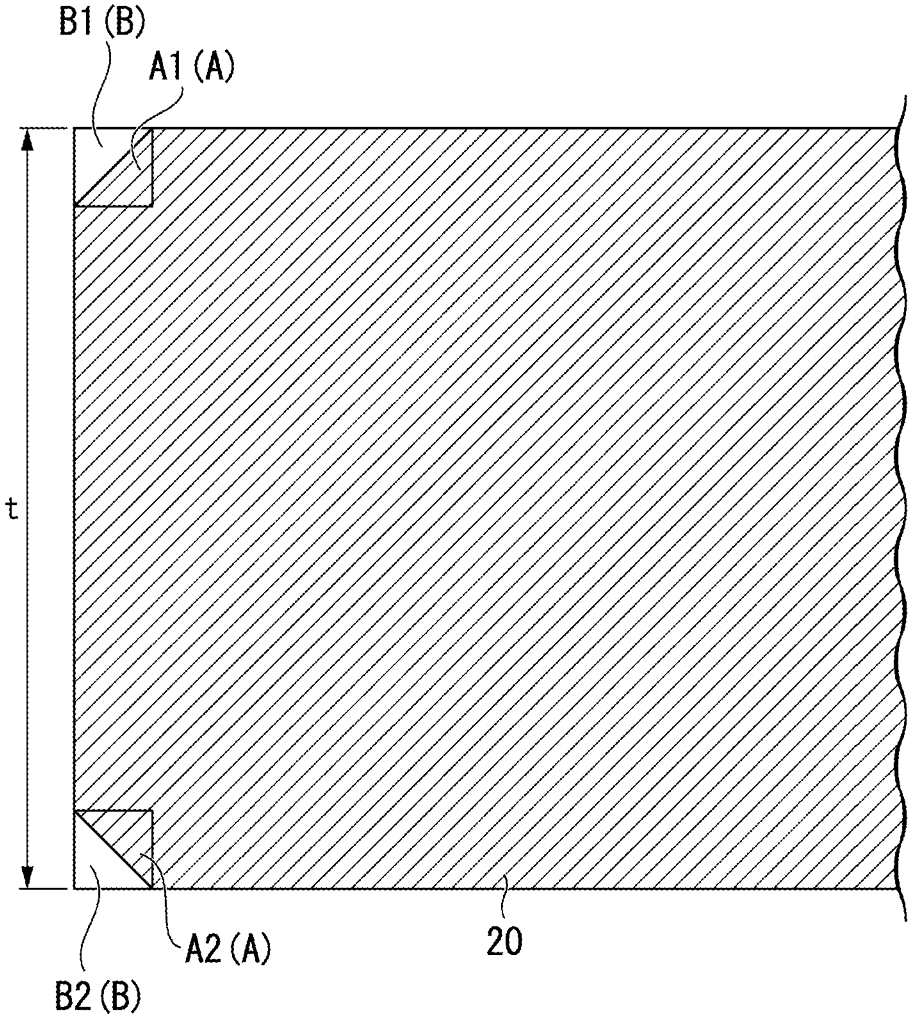

[FIG. 3A]
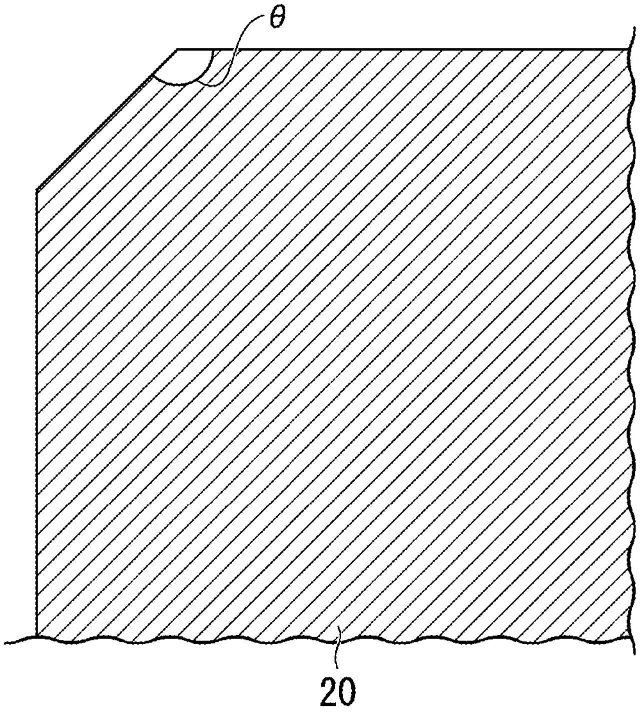
[FIG. 3B]
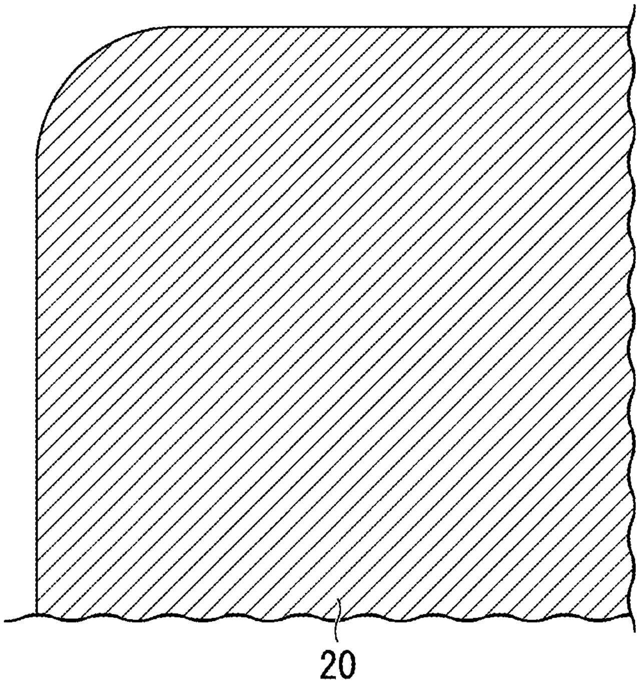

[FIG. 4]
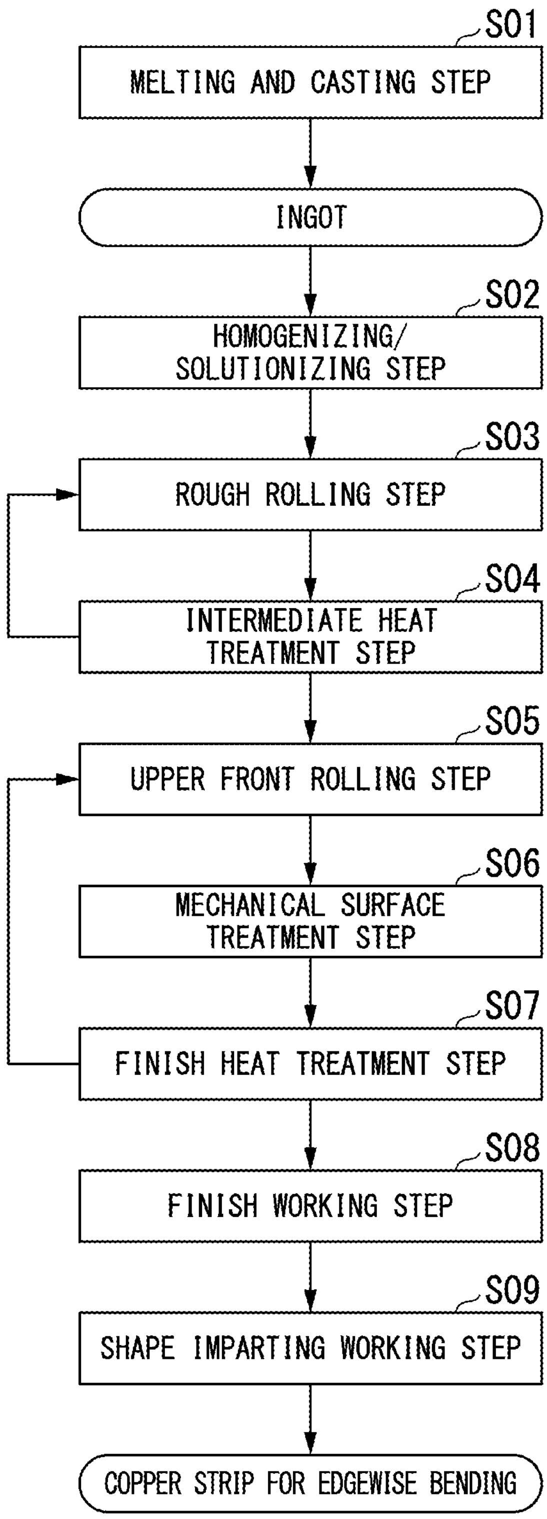

COPPER STRIP FOR EDGEWISE BENDING, COMPONENT FOR ELECTRIC OR ELECTRONIC DEVICE, AND BUS BAR

CROSS-REFERENCE TO RELATED PATENT APPLICATIONS

This application is a U.S. National Phase Application under 35 U.S.C. § 371 of International Patent Application No. PCT/JP2022/026578 filed on Jul. 4, 2022 and claims the benefit of priority to Japanese Patent Applications No. 2021-110693, filed on Jul. 2, 2021, No. 2022-060502, filed on Mar. 31, 2022, and No. 2022-106847, filed on Jul. 1, 2022, the contents of all of which are incorporated herein by reference in their entireties. The International Application was published in Japanese on Jan. 5, 2023 as International Publication No. WO 2023/277199 under PCT Article 21 (2).

FIELD OF THE INVENTION

The present invention provides a copper strip for edgewise bending which is suitable as a material of a component for electric or electronic devices such as a bus bar formed by edgewise bending, and a component for electric or electronic devices and a bus bar which are produced by using the copper strip for edgewise bending.

BACKGROUND OF THE INVENTION

In the related art, copper or a copper alloy with excellent electrical conductivity has been used for a component for electric or electronic devices such as a bus bar.

With an increase in current of electronic devices and electrical devices, in order to reduce the current density and diffuse heat due to Joule heat generation, a pure copper material such as oxygen-free copper with excellent electrical conductivity is adopted to a component for electric or electronic devices used for such electronic devices and electrical devices.

Further, in order to enable connection even in a narrow space, not only flatwise bending but also edgewise bending is performed on a component for electric or electronic devices. In this case, connection can be made even in a narrower space by reducing a bending radius R.

However, the pure copper material of the related art has a problem in that bendability necessary for molding electronic devices, electrical devices, and the like is insufficient and cracks occur particularly in a case where severe working such as edgewise bending is carried out.

Therefore, Japanese Unexamined Patent Application, First Publication No. 2013-004444 discloses an insulated rectangular copper wire including a rectangular copper wire formed of oxygen-free copper with a 0.2% yield strength of 150 MPa or less.

In the copper rolled plate described in Japanese Unexamined Patent Application, First Publication No. 2013-004444, since the 0.2% yield strength is suppressed to 150 MPa or less, degradation of voltage resistance characteristics in a bent portion in a case where the edgewise bending has been performed can be suppressed.

Further, Japanese Unexamined Patent Application, First Publication No. 2012-195212 discloses a rectangular insulating conductor material for coil, in which corner portions formed at the four corners of a cross section are chamfered with a curvature radius of 0.05 to 0.6 mm in order to maintain a surface insulating film, an arithmetic average roughness Ra is in a range of 0.05 to 0.3 μm, a maximum height Rz is in a range of 0.5 to 2.5 μm, and a ratio (Rq/Rz) of a root mean square roughness Rq to the maximum height Rz is in a range of 0.06 to 1.1.

CITATION LIST

Patent Document

[Patent Document 1]
Japanese Unexamined Patent Application, First Publication No. 2013-004444
[Patent Document 2]
Japanese Unexamined Patent Application, First Publication No. 2012-195212

Technical Problem

Meanwhile, recently, a thick bus bar or the like tends to be used in order to sufficiently realize reduction of a current density and diffusion of heat due to Joule heat generation.

Here, in a case of a rectangular copper wire, the material is thin so that edgewise bendability is not degraded, and thus the edgewise bendability of a thick material has not been considered. On the other hand, in a case where the thickness of a copper material used for a thick bus bar increases, shape processing is difficult to be carried out, and as a result, the quality of an end face is likely to deteriorate. Further, since the area of the end face increases and the roughness increases, the edgewise bendability is degraded.

That is, in a case where the thickness of a copper material increases, cracks are likely to occur on the outside of the bend when the copper material is subjected to edgewise bending, and thus there is a concern that the shape may be non-uniform. Accordingly, there is a demand for a copper material that can be edgewise-bent under stricter conditions than in the related art.

The present invention has been made in view of the above-described circumstances, and an objective thereof is to provide a copper strip for edgewise bending which can be edgewise-bent under strict conditions, and a component for electric or electronic devices and a bus bar which are produced by using this copper strip for edgewise bending.

SUMMARY OF THE INVENTION

Solution to Problem

In order to achieve the above-described object, according to the present invention, there is provided a copper strip for edgewise bending, which is edgewise-bent under a condition that a ratio R/W of a bending radius R to a width W is 5.0 or less, in which a thickness t is set to be in a range of 1 mm or more and 10 mm or less, and using an intersection of a straight line which is in contact with a surface and is parallel to a width direction and a straight line which is in contact with an end face and is perpendicular to the width direction as a reference in a cross section orthogonal to a longitudinal direction, an area ratio B/(A+B) to be calculated from an area (A) of a portion where copper is present and an area (B) of a portion where copper is not present is in a range of more than 10% and 100% or less in a square region where the length of one side is 1/10 of the thickness t. Further, the end face of the present invention is a surface extending in the longitudinal direction and parallel to a plate thickness direction.

According to the copper strip for edgewise bending with the above-described configuration, since the area ratio B/(A+B) to be calculated from an area (A) of a portion where copper is present and an area (B) of a portion where copper is not present is in a range of more than 10% and 100% or less in a square region where the length of one side is 1/10 of the thickness t using an intersection of a straight line which is in contact with a surface and is parallel to the width direction and a straight line which is in contact with an end face and is perpendicular to the width direction as a reference in a cross section orthogonal to the longitudinal direction, the stress concentration at a corner portion between the surface and the end face is suppressed, the stress spreads evenly on the bent end face, and the occurrence of cracks or breaking can be suppressed even in a case where the edgewise bending is performed under a strict condition that the ratio R/W of the bending radius R to the width W is 5.0 or less. Further, in a case where edgewise bending is performed, wrinkles are less likely to occur inside the copper strip, and a uniform shape can be obtained.

Further, since the thickness t is set to be in a range of 1 mm or more and 10 mm or less, reduction of the current density and diffusion of heat by Joule heat generation can be sufficiently realized.

Here, in the copper strip for edgewise bending of the present invention, the content of Cu is preferably 99.90 mass % or more.

In this case, when the content of Cu is set to 99.90 mass % or more, the amount of impurities is small, and the electrical conductivity can be ensured.

Further, in the copper strip for edgewise bending according to the present invention, it is preferable that the copper strip contains one or two or more selected from Mg, Ca, and Zr in a total content in a range of more than 10 mass ppm and less than 100 mass ppm.

In this case, since the copper strip contains one or two or more selected from Mg, Ca, and Zr in the above-described range, Mg forms a solid solution in a copper matrix, and thus the strength, heat resistance, and edgewise bendability can be improved without significantly reducing the electrical conductivity. Further, Ca or Zr and Cu generate an intermetallic compound, and thus the crystal grain size can be reduced and the edgewise bendability can be improved without significantly reducing the electrical conductivity.

Further, in the copper strip for edgewise bending according to the present invention, it is preferable that an electrical conductivity is 97.0% IACS or more.

In this case, since the electrical conductivity is 97.0% IACS or more, heat generation during conduction can be suppressed, and thus the copper strip is particularly suitable for a component for electric or electronic devices, and a bus bar.

Further, in the copper strip for edgewise bending according to the present invention, it is preferable that a ratio W/t of the width W to the thickness t is 2 or more.

In this case, since the ratio W/t of the width W to the thickness t is set to 2 or more, the copper strip is particularly suitable as a material for a component for electric or electronic devices, and a bus bar.

Further, in the copper strip for edgewise bending according to the present invention, it is preferable that an average crystal grain size of a plate thickness central portion is 50 μm or less. Further, in the present invention, the plate thickness central portion is defined as a region of 25% to 75% of the total thickness from the surface in the plate thickness direction.

In this case, since the average crystal grain size in the plate thickness central portion is set to 50 μm or less, the edgewise bendability is more excellent.

Further, in the copper strip for edgewise bending of the present invention, it is preferable that the concentration of Ag is in a range of 5 mass ppm or more and 20 mass ppm or less.

In this case, since the concentration of Ag is set to be in the above-described range, the added Ag is segregated in the vicinity of grain boundaries, movement of atoms at the grain boundaries is hindered, and thus the crystal grain size can be reduced. Therefore, more excellent edgewise bendability can be obtained.

Furthermore, in the copper strip for edgewise bending of the present invention, it is preferable that the concentration of H is 10 mass ppm or less, the concentration of O is 500 mass ppm or less, the concentration of C is 10 mass ppm or less, and the concentration of S is 10 mass ppm or less.

In this case, since the concentration of H, the concentration of O, the concentration of C, and the concentration of S are controlled to be in the above-described ranges, occurrence of defects can be suppressed, and degradation of workability and electrical conductivity can be suppressed.

Further, in the copper strip for edgewise bending of the present invention, it is preferable that the copper strip is a slit material of which the end face is a slit face.

In this case, since the end face is a slit-processed slit face, and the area ratio B/(A+B) to be calculated from an area (A) of a portion where copper is present and an area (B) of a portion where copper is not present is in a range of more than 10% and 100% or less in a square region where the length of one side is 1/10 of the thickness t using an intersection of a straight line which is in contact with a surface and is parallel to the width direction and a straight line which is in contact with an end face and is perpendicular to the width direction as a reference in a cross section orthogonal to the longitudinal direction, the stress concentration at a corner portion between the surface and the end face is suppressed, the stress spreads evenly on the bent end face, and the occurrence of cracks or breaking can be suppressed even in a case where the edgewise bending is performed under a strict condition that the ratio R/W of the bending radius R to the width W is 5.0 or less.

A component for electric or electronic devices according to the present invention is produced by using the copper strip for edgewise bending described above.

Since the component for electric or electronic devices with the above-described configuration is produced by using the copper strip for edgewise bending with excellent bendability as described above, occurrence of cracks or the like is suppressed, and the quality of the component is excellent.

A bus bar according to the present invention is produced by using the copper strip for edgewise bending described above.

Since the bus bar with the above-described configuration is produced by using the copper strip for edgewise bending with excellent bendability as described above, occurrence of cracks or the like is suppressed, and the quality of the component is excellent.

Here, in the bus bar of the present invention, a plating layer may be formed on an current carrying portion.

In this case, since a plating layer is provided on the current carrying portion that conducts other members in a contact manner, oxidation and the like can be suppressed, and the resistance to contact with other members can be lowered.

Further, it is preferable that the bus bar of the present invention includes an edgewise bent portion and an insulating coating portion.

In this case, since the area ratio B/(A+B) to be calculated from an area (A) of a portion where copper is present and an area (B) of a portion where copper is not present is in a range of more than 10% and 100% or less in a square region where the length of one side is 1/10 of the thickness t using an intersection of a straight line which is in contact with a surface and is parallel to the width direction and a straight line which is in contact with an end face and is perpendicular to the width direction as a reference in a cross section orthogonal to the longitudinal direction, occurrence of defects such as cracks in the edgewise bent portion is suppressed, and thus damage to the insulating coating portion can be suppressed.

Advantageous Effects of Invention

According to the present invention, it is possible to provide a copper strip for edgewise bending which can be edgewise-bent under strict conditions, and a component for electric or electronic devices and a bus bar which are produced by using this copper strip for edgewise bending.

BRIEF DESCRIPTION OF THE DRAWINGS

FIG. 1A is an explanatory view showing an example of a component (bus bar) for electric or electronic devices produced by using a copper strip for edgewise bending according to the present embodiment, and is also a top view.

FIG. 1B is an explanatory view showing an example of the component (bus bar) for electric or electronic devices produced by using the copper strip for edgewise bending according to the present embodiment, and is also a cross-sectional arrow view taken along line X-X of FIG. 1A.

FIG. 2 is an enlarged explanatory view showing a cross section of the copper strip for edgewise bending according to the present embodiment.

FIG. 3A is an explanatory view showing a shape of a corner portion between a surface and an end face of the copper strip for edgewise bending.

FIG. 3B is an explanatory view showing a shape of a corner portion between a surface and an end face of the copper strip for edgewise bending.

FIG. 4 is a flowchart showing a method of producing the copper strip for edgewise bending according to the present embodiment.

DETAILED DESCRIPTION OF THE INVENTION

Hereinafter, a copper strip for edgewise bending and a component for electric or electronic devices (bus bar) according to an embodiment of the present invention will be described.

First, a bus bar 10 according to the present embodiment will be described. As shown in FIG. 1A, the bus bar 10 according to the present embodiment is provided with an edgewise bent portion 13.

Further, as shown in FIG. 1B, the bus bar 10 according to the present embodiment includes a copper strip 20 for edgewise bending, plating layers 15 formed on the surfaces of the copper strip 20 for edgewise bending, and insulating coating portions 17 for coating the copper strip 20 for edgewise bending.

The bus bar 10 according to the present embodiment is produced by performing edgewise bending on the copper strip 20 for edgewise bending described below. Here, the edgewise bending is performed under a condition that a ratio R/W of a bending radius R to a width W is 5.0 or less. Although not particularly limited, the ratio R/W of the bending radius R to the width W may be 0.1 or more.

The thickness t of the copper strip 20 for edgewise bending according to the present embodiment is set to be in a range of 1 mm or more and 10 mm or less.

In the present embodiment, the copper strip 20 for edgewise bending is slit-processed, and it is preferable that the end face thereof is a slit face.

Further, in the copper strip 20 for edgewise bending according to the present embodiment, the ratio W/t of the width W to the thickness t is preferably 2 or more. Although not particularly limited, the ratio W/t of the width W to the thickness t may be 50 or less.

Further, in the copper strip 20 for edgewise bending according to the present embodiment, as shown in FIG. 2, the area ratio B/(A+B) to be calculated from an area (A) of a portion where copper is present and an area (B) of a portion where copper is not present is in a range of more than 10% and 100% or less in a square region where the length of one side is 1/10 of the thickness t of the copper strip 20 for edgewise bending using an intersection of a straight line which is in contact with a surface and is parallel to the width direction and a straight line which is in contact with an end face and is perpendicular to the width direction as a reference in a cross section orthogonal to the longitudinal direction.

The lower limit of the area ratio B/(A+B) may be 12% or 15%.

Further, in the copper strip 20 for edgewise bending according to the present embodiment, an inclination is formed between the surface and the end face as shown in FIGS. 3A and 3B, and an angle θ of this inclination with respect to the surface is, for example, more than 90° and less than 180°, preferably 100° or more and 170° or less, and more preferably in a range of 110° or more and 160° or less. Further, it is more preferable that the surface and the end face are connected with each other in a form of a smooth curved surface, and for example, it is preferable that the surface and the end face are connected with each other in a form of a curved surface having a curvature radius that is 1/10 or more of the thickness.

Here, in the copper strip 20 for edgewise bending according to the present embodiment, the content of Cu is preferably 99.90 mass % or more.

Further, in the copper strip 20 for edgewise bending according to the present embodiment, the copper strip may contain one kind or two or more selected from Mg, Ca, and Zr in the total content in a range of more than 10 mass ppm and less than 100 mass ppm.

Further, in the copper strip 20 for edgewise bending according to the present embodiment, the concentration of Ag may be set to be in a range of 5 mass ppm or more and 20 mass ppm or less.

Further, in the copper strip 20 for edgewise bending according to the present embodiment, the concentration of H is preferably 10 mass ppm or less, the concentration of O is preferably 500 mass ppm or less, the concentration of C is preferably 10 mass ppm or less, and the concentration of S is preferably 10 mass ppm or less.

Further, in the copper strip 20 for edgewise bending according to the present embodiment, the electrical conductivity is preferably 97.0% IACS or more.

In addition, in the copper strip 20 for edgewise bending according to the present embodiment, the average crystal grain size at the plate thickness central portion is preferably 50 μm or less. Further, the plate thickness central portion is defined as a region of 25% to 75% of the total thickness from the surface in the plate thickness direction. Although not particularly limited, the average crystal grain size at the plate thickness central portion may be 5 μm or more.

Here, the reason why the shape, the component composition, the texture, and various characteristics are specified as described above in the copper strip 20 for edgewise bending according to the present embodiment will be described below.

Thickness t

In the copper strip 20 for edgewise bending according to the present embodiment, reduction of the current density and diffusion of heat by Joule heat generation can be sufficiently realized by setting the thickness t to 1 mm or more.

Meanwhile, in the copper strip 20 for edgewise bending according to the present embodiment, in a case where edgewise bending is performed, wrinkles are unlikely to occur inside the copper strip by setting the thickness t to 10 mm or less, and thus the copper strip can be molded in a uniform shape.

Further, the lower limit of the thickness t of the copper strip 20 for edgewise bending is set to preferably 1.2 mm or more and more preferably 1.5 mm or more. Meanwhile, the upper limit of the thickness t of the copper strip 20 for edgewise bending is set to preferably 9.0 mm or less and more preferably 8.0 mm or less.

Width W

In the copper strip 20 for edgewise bending according to the present embodiment, the copper strip can be provided with a large current and a large voltage and heat generation due to conduction can be suppressed, by sufficiently increasing the width W. Accordingly, the width of the copper strip 20 for edgewise bending is set to 10 mm or more, preferably 15 mm or more, and more preferably 20 mm or more. Further, although not particularly limited, the width W is set to 60 mm or less.

Shape of Corner Portion Between Surface and End Face

In the copper strip 20 for edgewise bending according to the present embodiment, as shown in FIG. 2, in a case where the area ratio B/(A+B) to be calculated from an area (A) of a portion where copper is present and an area (B) of a portion where copper is not present is in a range of more than 10% and 100% or less in a square region where the length of one side is 1/10 of the thickness t of the copper strip 20 for edgewise bending using an intersection of a straight line which is in contact with a surface and is parallel to the width direction and a straight line which is in contact with an end face and is perpendicular to the width direction as a reference in a cross section orthogonal to the longitudinal direction, the stress concentration at this corner portion can be sufficiently suppressed during edgewise bending, and thus the edgewise bending can be stably performed. In addition, the corner portion is provided at least on an end face which is the outside during the edgewise bending.

As described below, the ratio B/(A+B) described above can be adjusted by performing a chamfering process, a drawing process, an extruding process, a forging process, a cutting process, a polishing process, or the like on the corner portion between the surface and the end face.

Ratio W/t of Width W to Thickness t

In the copper strip 20 for edgewise bending according to the present embodiment, the copper strip is particularly suitable as the material for a bus bar in a case where the ratio W/t of the width W to the thickness t is set to 2 or more.

Further, the lower limit of the ratio W/t of the width W to the thickness t is more preferably 3 or more and still more preferably 4 or more. Meanwhile, the upper limit of the ratio W/t of the width W to the thickness t is not particularly limited, but is preferably 50 or less and more preferably 40 or less.

Cu

In the copper strip 20 for edgewise bending according to the present embodiment, the electrical conductivity increases as the content of Cu increases and the concentration of impurities is relatively small. Therefore, in the present embodiment, it is preferable that the content of Cu is set to 99.90 mass % or more.

Further, in the copper strip 20 for edgewise bending according to the present embodiment, the content of Cu is set to more preferably 99.93 mass % or more and still more preferably 99.95 mass % or more in order to further improve the electrical conductivity.

One or Two or More Selected from Mg, Ca, and Zr

Mg is an element having an effect of improving the strength without greatly decreasing the electrical conductivity by forming a solid solution in the matrix of copper. Further, the strength or the heat resistance are improved by forming Mg into a solid solution in the matrix. Further, the texture is uniformized and the work hardenability is improved by adding Mg, and thus the workability of edgewise bending is improved. Therefore, Mg may be added in order to improve the strength, the heat resistance, the edgewise bendability, or the like.

Further, in a case where Ca or Zr is added, copper and an intermetallic compound are formed in the matrix, the texture is uniformized and the work hardenability is improved without significantly reducing the electrical conductivity, the crystal grain size is reduced, and thus the edgewise bendability can be further improved. Therefore, Ca or Zr may be added in order to improve the edgewise bendability or the like.

Here, the above-described effects can be exhibited by setting the total content of one or two or more selected from Mg, Ca, and Zr to more than 10 mass ppm. Meanwhile, a decrease in the electrical conductivity can be suppressed by setting the total content of one or two or more selected from Mg, Ca, and Zr to less than 100 mass ppm.

Therefore, in the present embodiment, in a case where one or two or more selected from Mg, Ca, and Zr are added, it is preferable that the total content of one or two or more selected from Mg, Ca, and Zr is set to more than 10 mass ppm and less than 100 mass ppm.

In order to further improve the strength, the heat resistance, the edgewise bendability, and the like, the lower limit of the total content of one or two or more selected from Mg, Ca, and Zr is set to more preferably 20 mass ppm or more, still more preferably 30 mass ppm or more, and even still more preferably 40 mass ppm or more. Further, in order to further suppress a decrease in the electrical conductivity, the upper limit of the total content of one or two or more selected from Mg, Ca, and Zr is set to more preferably less than 90 mass ppm, still more preferably less than 80 mass ppm, and even still more preferably less than 70 mass ppm.

Ag

A small amount of Ag added to copper is segregated in the vicinity of grain boundaries. In this manner, the movement of atoms at the grain boundaries is hindered, the crystal grain size is reduced, and thus more excellent bendability (flat bendability or edgewise bendability) can be obtained.

Here, the above-described effects can be exhibited by setting the concentration of Ag to 5 mass ppm or more. Meanwhile, a decrease in the electrical conductivity can be suppressed and an increase in production cost can also be suppressed by setting the content of Ag to 20 mass ppm or less.

Therefore, in the present embodiment, in a case where the copper strip contains Ag, it is preferable that the concentration of Ag is set to 5 mass ppm or more and 20 mass ppm or less.

In order to reliably reduce the crystal grain size, the lower limit of the concentration of Ag is set to more preferably 6 mass ppm or more, still more preferably 7 mass ppm or more, and even still more preferably 8 mass ppm or more. Further, in order to further suppress a decrease in the electrical conductivity and an increase in the production cost, the upper limit of the concentration of Ag is set to more preferably 18 mass ppm or less, still more preferably 16 mass ppm or less, and even still more preferably 14 mass ppm or less.

H

Hydrogen (H) is an element that combines with oxygen (O) to form water vapor in a case of casting and causes blowhole defects in an ingot. The blowhole defects cause defects such as cracks in a case of casting, and blister and peeling in a case of rolling. These defects, such as cracks, blister, and peeling, cause breakage due to stress concentration.

Therefore, in the copper strip 20 for edgewise bending according to the present embodiment, it is preferable that the concentration of H is set to 10 mass ppm or less. Further, the concentration of H is set to preferably 4 mass ppm or less and more preferably 2 mass ppm or less.

O

Oxygen (O) is an element that reacts with each component element in a copper alloy to form an oxide. Since such an oxide serves as the starting point for breakage, the workability is degraded, which makes the production difficult.

Therefore, in the copper strip 20 for edgewise bending according to the present embodiment, it is preferable that the concentration of O is set to 500 mass ppm or less.

Further, the concentration of O is set to more preferably 400 mass ppm or less, still more preferably 200 mass ppm or less, even still more preferably 100 mass ppm or less, even still more preferably 50 mass ppm or less, and most preferably 20 mass ppm or less.

C

Carbon (C) is an element that is used to coat the surface of a molten metal in a case of melting and casting for the objective of deoxidizing the molten metal and thus may inevitably be mixed. The concentration of C increases as C inclusion during casting increases. The segregation of C, a composite carbide, and a solid solution of C deteriorates the cold workability.

Therefore, in the copper strip 20 for edgewise bending according to the present embodiment, it is preferable that the concentration of C is set to 10 mass ppm or less.

Further, the concentration of C is set to more preferably 5 mass ppm or less and still more preferably 1 mass ppm or less.

S

Sulfur (S) significantly decreases the electrical conductivity in a case where copper contains S.

Therefore, in the copper strip 20 for edgewise bending according to the present embodiment, it is preferable that the concentration of S is set to 10 mass ppm or less.

Further, the concentration of S is preferably 5 mass ppm or less and more preferably 1 mass ppm or less.

Other Inevitable Impurities

Examples of other inevitable impurities in addition to the above-described elements include Al, As, B, Ba, Be, Bi, Cd, Cr, Sc, rare earth elements, V, Nb, Ta, Mo, Ni, W, Mn, Re, Ru, Sr, Ti, Os, P, Co, Rh, Ir, Pb, Pd, Pt, Au, Zn, Hf, Hg, Ga, In, Ge, Y, Tl, N, S, Sb, Se, Si, Sn, Te, and Li. The copper strip may contain these inevitable impurities within a range not affecting the characteristics.

Here, since there is a concern that the electrical conductivity is decreased, it is preferable that the content of the inevitable impurities is reduced.

Electrical Conductivity

In the copper strip 20 for edgewise bending according to the present embodiment, the copper strip is particularly suitable as a bus bar in a case where the electrical conductivity is sufficiently high because heat generation during conduction is suppressed.

Therefore, in the copper strip 20 for edgewise bending according to the present embodiment, it is preferable that the electrical conductivity is preferably 97.0% IACS or more.

Further, the electrical conductivity is more preferably 97.5% IACS or more, still more preferably 98.0% IACS or more, even still more preferably 98.5% IACS or more, and most preferably 99.0% IACS or more.

Average Crystal Grain Size at Plate Thickness Central Portion

In the copper strip 20 for edgewise bending according to the present embodiment, in a case where the average crystal grain size at the plate thickness central portion (region of 25% to 75% of the total thickness from the surface in the plate thickness direction) is fine, excellent bendability can be obtained.

Therefore, in the copper strip 20 for edgewise bending according to the present embodiment, it is preferable that the average crystal grain size at the plate thickness central portion is set to 50 μm or less.

Further, the average crystal grain size at the plate thickness central portion (region of 25% to 75% of the total thickness from the surface in the plate thickness direction) is more preferably 40 μm or less and still more preferably 30 μm or less. The average crystal grain size is even still more preferably 25 μm or less. Further, the lower limit of the average crystal grain size at the plate thickness central portion is not particularly limited, but is substantially 1 μm or more.

Next, a method of producing the copper strip 20 for edgewise bending according to the present embodiment with such a configuration will be described with reference to the flowchart of FIG. 4.

Melting and Casting Step S01

First, a copper raw material is melted to obtain molten copper. The components are adjusted by adding one or two or more selected from Mg, Ca, and Zr, and Ag as necessary. Further, in a case where one or two or more selected from Mg, Ca, and Zr, and Ag are added, a single element, a matrix alloy, or the like can be used. In addition, raw materials containing the above-described elements may be melted together with the copper raw material. Further, a recycled material or a scrap material may be used.

Here, as the copper raw material, so-called 4N Cu in which the content of Cu is 99.99 mass % or more or so-called 5N Cu in which the content of Cu is 99.999 mass % or more is preferably used.

In order to reduce the hydrogen concentration in a case of melting, it is preferable that the melting is carried out in an atmosphere using an inert gas atmosphere (for example, Ar gas) in which the vapor pressure of $H_2O$ is low and the retention time for the melting is set to the minimum.

Further, the molten copper in which the components have been adjusted is injected into a mold to produce an ingot. In consideration of mass production, it is preferable to use a continuous casting method or a semi-continuous casting method. In regard to the shape, the plate, the strip, the rod, and the line can be appropriately selected depending on the final shape.

Homogenizing/Solutionizing Step S02

Next, a heat treatment is performed for homogenization and solutionization of the obtained ingot. An intermetallic compound or the like generated by segregation and concentration of impurities in the solidification process is present inside the ingot in some cases. Therefore, in order to eliminate or reduce the segregation, the intermetallic compound, and the like impurities are homogeneously diffused in the ingot by performing a heat treatment of heating the ingot to 300° C. or higher and 1080° C. or lower. In addition, it is preferable that the homogenizing/solutionizing step S02 is performed in a non-oxidizing or reducing atmosphere.

Here, in a case where the heating temperature is lower than 300° C., the solutionization may be incomplete, and thus the texture may be non-uniform and the intermetallic compound may remain in the matrix. On the contrary, in a case where the heating temperature is higher than 1080° C., a part of the copper material serves a liquid phase, and thus the texture and the surface state may be non-uniform. Therefore, the heating temperature is set to be in a range of 300° C. or higher and 1080° C. or lower. Further, hot rolling may be performed after the above-described homogenizing/solutionizing step S02 in order to improve the efficiency of rough rolling and uniformize the texture described below. Further, it is preferable that the hot working temperature is set to be in a range of 300° C. or higher and 1080° C. or lower.

Rough Rolling Step S03

In order to work the copper material in a predetermined shape, rough rolling is performed. Further, the temperature conditions for this rough rolling step S03 are not particularly limited, but the working temperature is set to be preferably in a range of −200° C. to 200° C., at which cold rolling or warm rolling is carried out, and particularly preferably room temperature from the viewpoint of suppressing recrystallization or improving the dimensional accuracy. Here, uniformly recrystallized grains can be obtained in an intermediate heat treatment step S04 described below by uniformly introducing a strain into the material. Therefore, the total working rate (area reduction rate) is set to preferably 50% or more, more preferably 60% or more, and still more preferably 70% or more. Further, the working rate (area reduction rate) per pass is set to preferably 10% or more, more preferably 15% or more, and still more preferably 20% or more.

Intermediate Heat Treatment Step S04

After the rough rolling step S03, a heat treatment is performed to obtain a recrystallized texture. Further, the rough rolling step S03 and the intermediate heat treatment step S04 may be repeatedly performed.

Here, since this intermediate heat treatment step S04 is substantially the final recrystallization heat treatment, the crystal grain size of the recrystallized texture obtained in this step is approximately the same as the final crystal grain size. Therefore, in the intermediate heat treatment step S04, it is preferable that the heat treatment conditions are appropriately selected such that the average crystal grain size at the plate thickness center is set to 50 μm or less.

Prefinal Rolling Step S05

Prefinal rolling may be performed to work the copper material after the intermediate heat treatment step S04 in a predetermined shape. Further, this prefinal rolling step S05 is performed under a temperature condition of preferably −200° C. to 200° C., at which cold working or hot working is performed, and particularly preferably room temperature from the viewpoint of suppressing recrystallization during rolling. In addition, the rolling rate is appropriately selected so that the shape of the copper material approximates the final shape, but it is preferable that the rolling rate is set to 1% or more and 30% or less.

Mechanical Surface Treatment Step S06

After the prefinal working step S05, a mechanical surface treatment is performed. The mechanical surface treatment is a treatment of applying compressive stress to the vicinity of the surface, and has an effect of suppressing cracks occurring due to the compressive stress in the vicinity of the surface during the flatwise bending and improving the bendability.

As the mechanical surface treatment, various methods, which have been typically used, such as a shot peening treatment, a blast treatment, a lapping treatment, a polishing treatment, buff polishing, grinder polishing, sandpaper polishing, a tension leveler treatment, and light rolling with a low rolling reduction rate per pass (light rolling is repeatedly performed three times or more by setting the rolling reduction rate per pass to 1% to 10%) can be used.

Finish Heat Treatment Step S07

Next, a finish heat treatment may be performed on the copper material obtained by the mechanical surface treatment step S06 in order to remove the segregation of contained elements to grain boundaries and the residual strain. It is preferable that the heat treatment is performed in a non-oxidizing atmosphere or a reducing atmosphere. It is preferable that the heat treatment temperature is set to be in a range of 100° C. or higher and 500° C. or lower.

In this finish heat treatment step S07, it is necessary to set the heat treatment conditions (the temperature and the time) to avoid coarsening of the crystal grain size obtained in the intermediate heat treatment step S04. For example, it is preferable to hold the temperature at 450° C. for approximately 0.1 to 10 seconds and preferable to hold the temperature at 250° C. for 1 minute to 100 hours. It is preferable that the heat treatment is performed in a non-oxidizing atmosphere or a reducing atmosphere. A method of performing the heat treatment is not particularly limited, but it is preferable that the heat treatment is performed using a continuous annealing furnace for a short period of time from the viewpoint of the effect of reducing the production cost.

Further, the upper front rolling step S05, the mechanical surface treatment step S06, and the finish heat treatment step S07 described above may be repeatedly performed.

In addition, metal plating (such as Sn plating, Ni plating, or Ag plating) may be carried out after the finish heat treatment step S07.

Finish Working Step S08

Next, working may be appropriately performed as necessary for the objective of adjusting the material strength and imparting the shape. The temperature is set to preferably in a range of −200° C. to 200° C. at which cold working or hot working is performed and particularly preferably room temperature. Further, the working rate (area reduction rate) is appropriately selected so that the shape of the copper material approximates the final shape, but it is preferable that the working rate is set to be in a range of 1% or more and 30% or less. Examples of this working include rolling, a drawing process, an extruding process, a forging process, a cutting process, a polishing process.

Shape Processing Step S09

The copper material after the finish heat treatment step S07 or the finish working step S08 is subjected to shape processing as necessary in order to work the copper material in a desired shape.

As the shape processing, various methods that have been typically used, such as a slit process, a pushback process, a punching process, a drawing process, a swaging process, and a conforming process, can be used. In addition, a slit process performed by a precision shearing method may be used. Specifically, various methods that have been typically used, such as a counter cut method of separating materials by semi-shearing and reverse shearing and a roll slitting method of separating materials by semi-shearing and pressing with a roll, can be used.

Further, the corner portion between the surface and the end face is treated (corner portion treatment) as necessary after the shape processing. The corner portion treatment can be performed by using various methods that have been typically used, such as chamfering, a cutting process, and a polishing process.

Further, in a case where a pushback process, a drawing process, a swaging process, a conforming process, a slit process performed by a precision shearing method, or the like is used as the shape imparting working, the corner portion treatment may not be performed. Further, a heat treatment may be performed before this working.

In this manner, the copper strip 20 for edgewise bending according to the present embodiment is produced.

In the copper strip 20 for edgewise bending according to the present embodiment with the above-described configuration, since the area ratio B/(A+B) to be calculated from an area (A) of a portion where copper is present and an area (B) of a portion where copper is not present is in a range of more than 10% and 100% or less in a square region where the length of one side is 1/10 of the thickness t of the copper strip 20 for edgewise bending using an intersection of a straight line which is in contact with a surface and is parallel to the width direction and a straight line which is in contact with an end face and is perpendicular to the width direction as a reference in a cross section orthogonal to the longitudinal direction, the stress concentration at a corner portion between the surface and the end face is suppressed, the stress spreads evenly on the bent end face, and the occurrence of cracks or breaking can be suppressed even in a case where the edgewise bending is performed under a strict condition that the ratio R/W of the bending radius R to the width W is 5.0 or less.

Further, in the copper strip 20 for edgewise bending according to the present embodiment, since the thickness t is set to be in a range of 1 mm or more and 10 mm or less, reduction of the current density and diffusion of heat by Joule heat generation can be sufficiently realized. Further, in a case where edgewise bending is performed, wrinkles are less likely to occur inside the copper strip, and a uniform shape can be obtained.

Here, in the copper strip 20 for edgewise bending according to the present embodiment, the copper strip is particularly suitable as a material for a component for electric or electronic devices, and a bus bar in a case where the ratio W/t of the width W to the thickness t is set to 2 or more.

Further, in the copper strip 20 for edgewise bending according to the present embodiment, the amount of impurities is small and the electrical conductivity can be ensured in a case where the content of Cu is 99.90 mass % or more.

Further, in the copper strip 20 for edgewise bending according to the present embodiment, in a case where the copper strip contains one or two or more selected from Mg, Ca, and Zr in a total content in a range of more than 10 mass ppm and less than 100 mass ppm, Mg forms a solid solution in the copper matrix, and thus the strength, the heat resistance, and the edgewise bendability can be improved without significantly reducing the electrical conductivity. Further, Ca or Zr and Cu generate an intermetallic compound, and thus the crystal grain size can be reduced and the edgewise bendability can be improved without significantly reducing the electrical conductivity.

Further, in the copper strip 20 for edgewise bending according to the present embodiment, the added Ag is segregated in the vicinity of grain boundaries, movement of atoms at the grain boundaries is hindered, and thus the crystal grain size can be reduced in a case where the concentration of Ag is in a range of 5 mass ppm or more and 20 mass ppm or less.

Further, in the copper strip 20 for edgewise bending according to the present embodiment, occurrence of defects can be suppressed, and degradation of the workability and the electrical conductivity can be suppressed in a case where the concentration of H is 10 mass ppm or less, the concentration of O is 500 mass ppm or less, the concentration of C is 10 mass ppm or less, and the concentration of S is 10 mass ppm or less.

Further, in the copper strip 20 for edgewise bending according to the present embodiment, the electrical conductivity is sufficiently excellent, heat generation during conduction can be suppressed, and thus the copper strip is particularly suitable for a bus bar and a component for electric or electronic devices in a case where the electrical conductivity is 97.0% IACS or more.

Further, in the copper strip 20 for edgewise bending according to the present embodiment, the bendability is more excellent in a case where the average crystal grain size of the plate thickness central portion is 50 μm or less.

Further, in the copper strip 20 for edgewise bending according to the present embodiment, in a case where the copper strip is a slit material of which the end face is a slit face, since the area ratio B/(A+B) to be calculated from an area (A) of a portion where copper is present and an area (B) of a portion where copper is not present is in a range of more than 10% and 100% or less in a square region where the length of one side is 1/10 of the thickness t using an intersection of a straight line which is in contact with a surface and is parallel to the width direction and a straight line which is in contact with an end face and is perpendicular to the width direction as a reference in a cross section orthogonal to the longitudinal direction, the stress concentration at a corner portion between the surface and the end face is suppressed, the stress spreads evenly on the bent end face, and the occurrence of cracks or breaking can be suppressed even in a case where the edgewise bending is performed under a strict condition that the ratio R/W of the bending radius R to the width W is 5.0 or less.

Further, since the component for electric or electronic devices (bus bar 10) according to the present embodiment is produced by using the copper strip 20 for edgewise bending according to the present embodiment, occurrence of cracks is suppressed, and the quality of the component is excellent.

Further, in the bus bar 10 according to the present embodiment, oxidation and the like of the copper strip 20 for edgewise bending can be suppressed and the resistance to contact with other members can be lowered in a case where the plating layer 15 is provided on the surface thereof.

Further, in the bus bar 10 according to the present embodiment, in a case where the bus bar includes the edgewise bent portion 13 and the insulating coating portion 17, occurrence of defects such as cracks in the edgewise bent portion 13 is suppressed, and thus damage to the insulating coating portion 17 can be suppressed. The insulating coating portion 17 may be formed of an insulating coating material that has been typically used. Examples of the insulating coating material that has been typically used include resins with excellent electrical insulation properties such as polyamide imide, polyimide, polyester imide, polyurethane, and polyester.

Further, since the component for electric or electronic devices according to the present embodiment is produced by using the copper strip 20 for edgewise bending according to the present embodiment, occurrence of cracks is suppressed, and the quality of the component is excellent.

Examples

Hereinafter, results of a verification test conducted to verify the effects of the present invention will be described.

A matrix alloy containing 1 mass % of various additive elements was prepared by a zone-melting refining method using a raw material consisting of so-called 3N Cu having a Cu content of 99.9 mass % or more and so-called 5N Cu having a Cu content of 99.999 mass % or more.

The above-described copper raw material was inserted into a high-purity graphite crucible, and the material was melted with a high frequency in an atmosphere furnace having an Ar gas atmosphere.

Further, an ingot having the component composition listed in Tables 1 and 2 was produced by pouring the obtained molten copper into a heat insulating material mold. Further, the size of the ingot was set such that the thickness thereof was approximately 80 mm and the width thereof was approximately 500 mm.

The obtained ingot was heated at 900° C. for 1 hour in an Ar gas atmosphere, and the surface was ground to remove the oxide film, and the ingot was cut into a predetermined size.

Thereafter, the thickness of the ingot was appropriately adjusted to obtain the final thickness, and the ingot was cut. Each of the cut specimens was subjected to rough rolling under the conditions listed in Tables 1 and 2. Next, the intermediate heat treatment was performed so that the crystal grain sizes listed in Tables 3 and 4 were obtained. Next, the prefinal rolling step was performed under the conditions listed in Tables 1 and 2. Next, the mechanical surface treatment step was performed under the conditions listed in Tables 1 and 2. Next, the final heat treatment was performed under a temperature condition of 250° C. maintained for 1 minute. Further, the finish working step was performed such that the thickness t listed in Tables 3 and 4 was obtained. Further, the shape processing step and the corner portion treatment were carried out such that the plate width W listed in Tables 3 and 4 was obtained. In addition, the length was set to be in a range of 200 mm to 600 mm.

The obtained copper strip for edgewise bending was evaluated for the following items. The results thereof are listed in Tables 1 to 4.

Composition Analysis

A measurement specimen was collected from the obtained ingot, Mg, Ca, and Zr were measured by inductively coupled plasma atomic emission spectrophotometry, and other elements were measured using a glow discharge mass spectrometer (GD-MS). Further, H was analyzed by a thermal conductivity method, and O, S, and C were analyzed by an infrared absorption method. The amount of Cu was measured using copper electrogravimetry (JIS H 1051). Further, the measurement was performed at two sites, the central portion of the specimen and the end portion of the specimen in the width direction, and the larger content was defined as the content of the sample.

Electrical Conductivity

Test pieces having a width of 10 mm and a length of 60 mm were collected from the copper strip for edgewise bending, and the electric resistance was determined by a four-terminal method. Further, the dimension of each test piece was measured using a micrometer and the volume of the test piece was calculated. In addition, the electrical conductivity was calculated from the measured electric resistance value and volume. Further, the test pieces were collected such that the longitudinal direction thereof was parallel to the rolling direction of the copper strip for edgewise bending.

Average Crystal Grain Size at Plate Thickness Center Portion

A sample with a width of 20 mm and a length of 20 mm was cut out from the obtained copper strip for edgewise bending, and the average crystal grain size at the plate thickness center was measured by an electron backscatter diffraction patterns (SEM-EBSD) measuring device. A surface perpendicular to the width direction of rolling, that is, a transverse direction (TD) surface was used as an observation surface, and the surface was mechanically polished using waterproof abrasive paper and diamond abrasive grains. Next, finish polishing was performed using a colloidal silica solution, thereby obtaining a sample for measurement. Thereafter, the observation surface was measured in a measurement area of 10000 $\mu m^2$ or more at measurement intervals of 0.25 μm at an electron beam acceleration voltage of 15 kV by an EBSD method using an EBSD measuring device (Quanta FEG 450, manufactured by FEI, OIM Data Collection, manufactured by EDAX/TSL (currently AMETEK)) and analysis software (OIM Data Analysis ver. 7.3.1, manufactured by EDAX/TSL (currently AMETEK)). The measurement results were analyzed by the data analysis software OIM to obtain CI values at each measurement point. The orientation difference between each crystal grain was analyzed by the data analysis software OIM by excluding the measurement points with a CI value of 0.1 or less. Further, a boundary having 15° or more of an orientation difference between neighboring measurement points was assigned as a high-angle grain boundary, and a boundary having less than 15° of an orientation difference between neighboring measurement points was assigned as a low-angle grain boundary. Here, the twin crystal boundaries were also assigned as high-angle grain boundaries. Further, the measurement range was adjusted such that each sample contained 100 or more crystal grains. A crystal grain boundary map was created using the high-angle grain boundaries based on the obtained orientation analysis results. Five line segments with predetermined vertical and horizontal lengths were drawn on the crystal grain boundary map in conformity with the cutting method of JIS H 0501, the number of crystal grains that were completely cut was counted, and the average value was obtained by dividing the total cut length (length of the line segments cut off at the crystal grain boundaries) by the number of crystal grains. The average value was defined as the average crystal grain size. Further, the plate thickness central portion is a region of 25% to 75% of the total thickness from the surface in the plate thickness direction.

Shape of Corner Portion Between Surface and End Face

The area ratio B/(A+B) was calculated by observing a cross section of the obtained copper strip for edgewise bending orthogonal to the longitudinal direction and measuring an area (A) of a portion where copper was present and an area (B) of a portion where copper was not present in a square region where the length of one side was 1/10 of the thickness t in the end face which was the outside during the edgewise bending. The region where copper was present and the region where copper was not present were visually distinguished from each other based on the color. Further, A1 and A2, and B1 and B2 denote the area of each of corner portions on both sides of the end face. Further, the area of each corner portion is an average value obtained by measuring the areas of three sites.

Edgewise Bendability

The edgewise bending was performed such that the ratio R/W of the bending radius R to the plate width W was set as listed in Tables 3 and 4.

A case where no wrinkles occurred on the end face which is the outside of the edgewise bending was evaluated as "A" (excellent), a case where wrinkles occurred on the end face which is the outside of the edgewise bending was evaluated as "B" (good), a case where small cracks occurred on the end face which is the outside of the edgewise bending was evaluated as "C" (fair), and a case where breaking of the end face which is the outside of the edgewise bending was found and the edgewise bending could not be performed was evaluated as "D" (poor). Further, the evaluation results A to C were determined that "edgewise bending under severe conditions was possible".

TABLE 1

| | | Component composition (mass ratio) | | | | | | | | | Production step: Rough rolling | Upper front rolling | Mechanical surface treatment | Finish working | Shape imparting | |
|---|---|---|---|---|---|---|---|---|---|---|---|---|---|---|---|---|
| | | Cu (%) | Mg (ppm) | Ca (ppm) | Zr (ppm) | Ag (ppm) | H (ppm) | O (ppm) | C (ppm) | S (ppm) | Rolling rate (%) | Rolling rate (%) | Treatment method | Rolling rate (%) | Method | Corner portion treatment |
| Examples of present invention | 1 | 99.90 | — | — | — | 16 | 8.8 | 432 | 0.1 | 3.1 | 60 | 10 | Shot peening treatment | 10 | Slit process | Chamfering process |
| | 2 | 99.93 | — | — | — | 5 | 0.9 | 42 | 1.1 | 0.5 | 70 | 20 | Polishing treatment | 20 | Slit process | Cutting process |
| | 3 | 99.99 | — | — | — | — | 0.4 | 1 | 0.5 | 3.1 | 85 | — | Lapping treatment | — | Slit process | Drawing process |
| | 4 | 99.99 | — | — | — | 10 | 0.1 | 1 | 1.1 | 0.1 | 60 | 30 | Grinder polishing | 15 | Slit process | Cutting process |
| | 5 | 99.90 | — | — | — | 11 | 12.0 | 532 | 13.0 | 35.0 | 50 | 30 | Sandpaper polishing | 15 | Slit process | Polishing process |
| | 6 | 99.99 | — | — | — | 12 | 0.8 | 1 | 0.2 | 0.4 | 70 | 20 | Blast treatment | 20 | Slit process | Drawing process |
| | 7 | 99.99 | — | — | — | 12 | 0.2 | 1 | 0.1 | 2.9 | 75 | 20 | Grinder polishing | — | Slit process | Cutting process |
| | 8 | 99.90 | — | — | — | 8 | 0.3 | 321 | 0.5 | 7.2 | 60 | 30 | Grinder polishing | 25 | Slit process | Cutting process |
| | 9 | 99.95 | — | — | — | 12 | 0.5 | 3 | 0.2 | 10.0 | 50 | 20 | Sandpaper polishing | 20 | Slit process | Polishing process |

TABLE 1-continued

| | Component composition (mass ratio) | | | | | | | | | Production step | | | | | |
|---|---|---|---|---|---|---|---|---|---|---|---|---|---|---|---|
| | | | | | | | | | | Rough rolling | Upper front rolling | Mechanical surface treatment | Finish working | Shape imparting | |
| | | | | | | | | | | Rolling | Rolling | | Rolling | | Corner |
| | Cu (%) | Mg (ppm) | Ca (ppm) | Zr (ppm) | Ag (ppm) | H (ppm) | O (ppm) | C (ppm) | S (ppm) | rate (%) | rate (%) | Treatment method | rate (%) | Method | portion treatment |
| 10 | 99.93 | — | — | — | 15 | 7.2 | 149 | 3.3 | 4.8 | 50 | 10 | Buff polishing | 15 | Slit process | Polishing process |
| 11 | 99.95 | 6 | — | — | 9 | 9.3 | 2 | 9.4 | 2.9 | 70 | 10 | Lapping treatment | 20 | Slit process | Chamfering process |
| 12 | 99.95 | 12 | — | — | 12 | 0.1 | 2 | 1.2 | 0.2 | 75 | 30 | Tension leveler treatment | 20 | Slit process | Polishing process |
| 13 | 99.95 | 24 | — | — | 13 | 0.2 | 2 | 0.9 | 3.1 | 60 | 20 | Shot peening treatment | 25 | Slit process | Cutting process |
| 14 | 99.95 | 36 | — | — | 9 | 0.8 | 4 | 0.7 | 0.8 | 50 | 20 | Polishing treatment | 15 | Slit process | Polishing process |
| 15 | 99.95 | 45 | — | — | 11 | 0.2 | 1 | 0.8 | 2.9 | 85 | — | Tension leveler treatment | 5 | Slit process | Drawing process |
| 16 | 99.95 | 57 | — | — | 12 | 0.3 | 1 | 1.1 | 0.3 | 50 | 30 | Tension leveler treatment | 20 | Slit process | Polishing process |
| 17 | 99.95 | 71 | — | — | 12 | 0.1 | 2 | 0.7 | 3.4 | 60 | 30 | Shot peening treatment | 1 | Slit process | Drawing process |
| 18 | 99.95 | 88 | — | — | 6 | 0.6 | 2 | 0.6 | 3.1 | 50 | 20 | Tension leveler treatment | 15 | Slit process | Polishing process |

TABLE 2

| | | Component composition (mass ratio) | | | | | | | | | Production step | | | | | |
|---|---|---|---|---|---|---|---|---|---|---|---|---|---|---|---|---|
| | | | | | | | | | | | Rough rolling | Upper front rolling | Mechanical surface treatment | Finish working | Shape imparting | |
| | | | | | | | | | | | Rolling | Rolling | | Rolling | | Corner |
| | | Cu (%) | Mg (ppm) | Ca (ppm) | Zr (ppm) | Ag (ppm) | H (ppm) | O (ppm) | C (ppm) | S (ppm) | rate (%) | rate (%) | Treatment method | rate (%) | Method | portion treatment |
| Examples of present invention | 19 | 99.95 | 94 | — | — | 12 | 3.0 | 2 | 0.5 | 0.3 | 75 | 30 | Blast treatment | 10 | Slit process | Cham-fering process |
| | 20 | 99.95 | 98 | — | — | 15 | 0.5 | 1 | 0.3 | 3.1 | 60 | 10 | Buff polishing | 20 | Slit process | Cutting process |
| | 21 | 99.95 | 2405 | — | — | 11 | 0.1 | 2 | 0.2 | 3.4 | 70 | 20 | Sandpaper polishing | 15 | Slit process | Polishing process |
| | 22 | 99.95 | — | 99 | — | 9 | 0.1 | 1 | 0.3 | 4.5 | 60 | 20 | Grinder polishing | 5 | Slit process | Polishing process |
| | 23 | 99.95 | — | — | 88 | 13 | 2.2 | 2 | 0.1 | 3.0 | 70 | 30 | Blast treatment | 5 | Slit process | Polishing process |
| | 24 | 99.95 | 25 | 54 | — | 12 | 1.3 | 1 | 0.1 | 3.7 | 65 | 20 | Grinder polishing | 20 | Slit process | Cutting process |
| | 25 | 99.95 | — | 33 | 42 | 13 | 0.2 | 2 | 0.2 | 3.7 | 75 | 30 | Buff polishing | 25 | Punching process | Polishing process |
| | 26 | 99.95 | 23 | 24 | 52 | 11 | 0.5 | 2 | 0.4 | 3.1 | 50 | 20 | Lapping treatment | 20 | Pushback process | — |
| | 27 | 99.99 | — | — | — | 8 | 0.1 | 2 | 0.2 | 0.1 | 85 | — | Sandpaper polishing | | Drawing process | — |
| | 28 | 99.99 | — | — | — | 7 | 0.3 | 1 | 0.3 | 2.1 | 55 | 10 | Shot peening treatment | 20 | Swaging process | — |
| | 29 | 99.95 | 55 | — | — | 12 | 0.4 | 2 | 1.2 | 1.1 | 60 | 10 | Lapping treatment | 15 | Con-forming process | — |
| | 30 | 99.99 | — | — | — | 10 | 0.2 | 1 | 0.2 | 2.5 | 75 | 10 | Grinder polishing | 15 | Counter cut process | — |

TABLE 2-continued

| | | Component composition (mass ratio) | | | | | | | | | Production step: Rough rolling | Production step: Upper front rolling | Production step: Mechanical surface treatment | Production step: Finish working | Production step: Shape imparting | |
|---|---|---|---|---|---|---|---|---|---|---|---|---|---|---|---|---|
| | | Cu (%) | Mg (ppm) | Ca (ppm) | Zr (ppm) | Ag (ppm) | H (ppm) | O (ppm) | C (ppm) | S (ppm) | Rolling rate (%) | Rolling rate (%) | Treatment method | Rolling rate (%) | Method | Corner portion treatment |
| | 31 | 99.95 | — | — | — | 25 | 0.2 | 2 | 0.2 | 1.3 | 70 | 20 | Tension leveler treatment | 5 | Roll slit process | — |
| | 32 | 99.99 | — | — | — | 10 | 0.1 | 1 | 0.1 | 3.2 | 60 | 30 | Grinder polishing | 10 | Roll slit process | — |
| | 33 | 99.93 | — | — | — | 10 | 0.5 | 19 | 1.0 | 3.5 | 75 | 30 | Buff polishing | 20 | Roll slit process | — |
| | 34 | 99.95 | — | — | — | 12 | 0.2 | 1 | 0.1 | 3.4 | 60 | 20 | Tension leveler treatment | 20 | Roll slit process | — |
| | 35 | 99.95 | — | — | — | 8 | 0.2 | 2 | 0.2 | 3.3 | 60 | 30 | Tension leveler treatment | 15 | Roll slit process | — |
| Comparative Example | 1 | 99.95 | — | — | — | 15 | 0.2 | 2 | 0.1 | 3.6 | 60 | 30 | Tension leveler treatment | 15 | Slit process | — |
| | 2 | 99.95 | — | — | — | 10 | 0.2 | 2 | 0.2 | 3.2 | 75 | 30 | Polishing treatment | 18 | Slit process | Polishing process |
| | 3 | 99.95 | — | — | — | 14 | 0.2 | 3 | 2.0 | 4.1 | 70 | 30 | Polishing treatment | 15 | Slit process | Polishing process |

TABLE 3

| | | Shape | | | Evaluation: Shape of corner portion | | | | | | | | Edgewise bendability | |
|---|---|---|---|---|---|---|---|---|---|---|---|---|---|---|
| | | Plate thickness t (mm) | Plate width W (mm) | W/t | A1 ($mm^2$) | B1 ($mm^2$) | (B1/(B1 + A1)) × 100 (%) | A2 ($mm^2$) | B2 ($mm^2$) | (B2/(B2 + A2)) × 100 (%) | Electrical conductivity (% IACS) | Average crystal grain size at plate thickness central portion (μm) | Bending condition R/W | Evaluation |
| Examples of present invention | 1 | 2.0 | 20 | 10 | 0.000 | 0.040 | 100 | 0.000 | 0.040 | 100 | 100.4 | 18 | 0.20 | A |
| | 2 | 9.0 | 20 | 2 | 0.721 | 0.089 | 11 | 0.680 | 0.130 | 16 | 100.7 | 35 | 0.20 | C |
| | 3 | 3.0 | 20 | 7 | 0.063 | 0.027 | 30 | 0.063 | 0.027 | 30 | 100.5 | 64 | 0.15 | C |
| | 4 | 1.0 | 50 | 50 | 0.000 | 0.010 | 100 | 0.000 | 0.010 | 100 | 100.9 | 23 | 4.00 | A |
| | 5 | 5.0 | 30 | 6 | 0.200 | 0.050 | 20 | 0.198 | 0.052 | 21 | 97.1 | 23 | 0.07 | B |
| | 6 | 2.0 | 30 | 15 | 0.000 | 0.040 | 100 | 0.000 | 0.040 | 100 | 100.7 | 22 | 0.13 | A |
| | 7 | 2.0 | 20 | 10 | 0.000 | 0.040 | 100 | 0.000 | 0.040 | 100 | 100.4 | 22 | 0.50 | A |
| | 8 | 7.0 | 20 | 3 | 0.000 | 0.490 | 100 | 0.000 | 0.490 | 100 | 99.7 | 25 | 0.10 | A |
| | 9 | 5.0 | 20 | 4 | 0.000 | 0.250 | 100 | 0.000 | 0.250 | 100 | 99.4 | 22 | 0.10 | A |
| | 10 | 1.5 | 60 | 40 | 0.000 | 0.0225 | 100 | 0.000 | 0.0225 | 100 | 100.2 | 18 | 0.08 | A |
| | 11 | 8.0 | 20 | 3 | 0.128 | 0.512 | 80 | 0.128 | 0.512 | 80 | 100.3 | 22 | 2.00 | A |
| | 12 | 3.0 | 30 | 10 | 0.068 | 0.022 | 24 | 0.068 | 0.022 | 14 | 100.9 | 21 | 0.07 | C |
| | 13 | 3.0 | 20 | 7 | 0.054 | 0.036 | 40 | 0.056 | 0.034 | 38 | 100.3 | 20 | 1.00 | B |
| | 14 | 5.0 | 20 | 4 | 0.200 | 0.050 | 20 | 0.198 | 0.052 | 21 | 100.4 | 22 | 0.25 | B |
| | 15 | 2.0 | 60 | 30 | 0.020 | 0.020 | 50 | 0.020 | 0.020 | 50 | 100.5 | 22 | 5.00 | B |
| | 16 | 1.2 | 20 | 17 | 0.003 | 0.0114 | 79 | 0.003 | 0.0114 | 79 | 100.4 | 21 | 0.15 | A |
| | 17 | 2.0 | 20 | 10 | 0.008 | 0.032 | 80 | 0.008 | 0.032 | 80 | 100.3 | 22 | 0.15 | A |
| | 18 | 2.0 | 30 | 15 | 0.000 | 0.040 | 100 | 0.000 | 0.040 | 100 | 100.3 | 31 | 0.07 | A |

Bending condition: ratio R/W of bending radius R to plate width W

Shape of corner portion: areas A1 and A2 of portion where copper is present/areas B1 and B2 of portion where copper is not present in square region

TABLE 4

| | | Shape | | | Evaluation | | | | | | | | | |
|---|---|---|---|---|---|---|---|---|---|---|---|---|---|---|
| | | | | | Shape of corner portion | | | | | | | Average crystal grain size at plate thickness central portion | Edgewise bendability | |
| | | Plate thick-ness t (mm) | Plate width W (mm) | W/t | A1 ($mm^2$) | B1 ($mm^2$) | (B1/(B1 + A1)) × 100 (%) | A2 ($mm^2$) | B2 ($mm^2$) | (B2/(B2 + A2)) × 100 (%) | Electrical conductivity (% IACS) | (μm) | Bending condition R/W | Evaluation |
| Examples of present invention | 19 | 3.0 | 30 | 10 | 0.009 | 0.081 | 90 | 0.008 | 0.082 | 91 | 100.8 | 22 | 0.13 | A |
| | 20 | 10.0 | 20 | 2 | 0.300 | 0.700 | 70 | 0.290 | 0.710 | 71 | 100.4 | 17 | 0.25 | B |
| | 21 | 2.0 | 20 | 10 | 0.000 | 0.040 | 100 | 0.000 | 0.040 | 100 | 82.3 | 23 | 0.10 | A |
| | 22 | 3.0 | 20 | 7 | 0.002 | 0.088 | 98 | 0.002 | 0.088 | 98 | 100.2 | 8 | 0.10 | A |
| | 23 | 2.0 | 20 | 10 | 0.000 | 0.040 | 100 | 0.000 | 0.040 | 100 | 97.7 | 9 | 0.20 | A |
| | 24 | 2.0 | 20 | 10 | 0.019 | 0.021 | 53 | 0.018 | 0.022 | 55 | 100.2 | 11 | 1.00 | B |
| | 25 | 3.0 | 40 | 13 | 0.005 | 0.085 | 94 | 0.002 | 0.088 | 98 | 98.1 | 9 | 0.08 | A |
| | 26 | 2.0 | 20 | 10 | 0.001 | 0.039 | 98 | 0.003 | 0.037 | 93 | 98.6 | 9 | 0.10 | A |
| | 27 | 3.0 | 30 | 10 | 0.009 | 0.081 | 90 | 0.009 | 0.081 | 90 | 100.9 | 24 | 0.13 | A |
| | 28 | 3.0 | 40 | 13 | 0.054 | 0.036 | 40 | 0.054 | 0.036 | 40 | 100.3 | 26 | 0.10 | A |
| | 29 | 2.0 | 30 | 15 | 0.000 | 0.040 | 100 | 0.000 | 0.040 | 100 | 100.5 | 20 | 0.17 | A |
| | 30 | 2.0 | 20 | 10 | 0.000 | 0.040 | 100 | 0.000 | 0.040 | 100 | 100.3 | 23 | 0.10 | A |
| | 31 | 2.0 | 20 | 10 | 0.000 | 0.040 | 100 | 0.011 | 0.029 | 73 | 100.6 | 15 | 0.10 | A |
| | 32 | 3.0 | 20 | 7 | 0.000 | 0.090 | 100 | 0.012 | 0.078 | 87 | 100.3 | 22 | 0.15 | A |
| | 33 | 2.0 | 20 | 10 | 0.000 | 0.040 | 100 | 0.000 | 0.040 | 100 | 100.3 | 23 | 0.20 | A |
| | 34 | 3.0 | 30 | 10 | 0.000 | 0.090 | 100 | 0.015 | 0.075 | 83 | 100.4 | 21 | 0.07 | A |
| | 35 | 2.0 | 20 | 10 | 0.000 | 0.040 | 100 | 0.013 | 0.027 | 68 | 100.3 | 25 | 0.10 | A |
| Comparative Example | 1 | 2.0 | 30 | 15 | 0.040 | 0.000 | 0 | 0.040 | 0.000 | 0 | 100.3 | 18 | 0.07 | D |
| | 2 | 2.0 | 20 | 10 | 0.037 | 0.003 | 8 | 0.037 | 0.003 | 8 | 100.3 | 21 | 0.15 | D |
| | 3 | 3.0 | 20 | 7 | 0.000 | 0.090 | 100 | 0.090 | 0.000 | 0 | 100.2 | 18 | 0.15 | D |

Bending condition: ratio R/W of bending radius R to plate width W

Shape of corner portion: areas A1 and A2 of portion where copper is present/areas B1 and B2 of portion where copper is not present in square region In Comparative Example 1, in a case where the corner portion treatment was not performed after the slit process, the area ratios B1/(A1+B1) and B2/(A2+B2) were 0, the corner portions were broken, and the bendability was evaluated as "D".

In Comparative Example 2, in a case where the corner treatment was not sufficiently performed, the area ratios B1/(A1+B1) and B2/(A2+B2) were 10 or less, the corner portions were broken, and the bendability was evaluated as "D".

In Comparative Example 3, since only one face of the corner portions was treated, the area ratio B1/(A1+B1) was 100, but the area ratio B2/(A2+B2) was 0, the corner portions that had not been subjected to the corner portion treatment were broken, and the bendability was evaluated as "D".

On the contrary, in Example 1 to 35 of the present invention, the area ratio B/(A+B) calculated from an area (A) of a portion where copper was present and an area (B) of a portion where copper was not present was more than 10% and 100% or less in a square region where the length of one side was 1/10 of the thickness t using an intersection of a straight line which is in contact with a surface and is parallel to the width direction and a straight line which is in contact with an end face and is perpendicular to the width direction as a reference in a cross section orthogonal to the longitudinal direction, the bendability was evaluated as "A to C", and the edgewise bending characteristics were excellent.

As described above, according to the examples of the present invention, it was confirmed that a copper strip for edgewise bending which can be edgewise-bent under strict conditions can be obtained.

INDUSTRIAL APPLICABILITY

It is possible to provide a copper strip for edgewise bending which can be edgewise-bent under strict conditions, and a component for electric or electronic devices and a bus bar which are produced by using this copper strip for edgewise bending.

REFERENCE SIGNS LIST

10: Bus bar
13: Edgewise bent portion
15: Plating layer
17: Insulating coating portion
20: Copper strip for edgewise bending
B1, B2: Area of portion where copper is not present
A1, A2: Area of portion where copper is present
θ: Angle of inclination

The invention claimed is:

1. A copper strip for edgewise bending, wherein the copper strip is edgewise-bent under a condition where a ratio R/W of a bending radius R to a width W is 5.0 or less, a thickness t is in a range of 1 mm or more and 10 mm or less, and an area ratio B/(A+B) is in a range of more than 10% and less than 100% in a square region where the length of one side is 1/10 of the thickness t, where an intersection of a straight line which is in contact with a surface and is parallel to a width direction and a straight line which is in contact with an end face and is perpendicular to the width direction is used as a reference in a cross section orthogonal to a longitudinal direction, A is an area of a portion where copper is present, and B is an area of a portion where copper is not present.

2. The copper strip for edgewise bending according to claim 1, wherein a content of Cu is 99.90 mass % or more.

3. The copper strip for edgewise bending according to claim 1, wherein the copper strip contains one or two or more selected from Mg, Ca, and Zr in a total content in a range of more than 10 mass ppm and less than 100 mass ppm.

4. The copper strip for edgewise bending according to claim 1, wherein an electrical conductivity is 97.0% IACS or more.

5. The copper strip for edgewise bending according to claim 1, wherein a ratio W/t of the width W to the thickness t is 2 or more.

6. The copper strip for edgewise bending according to claim 1, wherein an average crystal grain size of a plate thickness central portion is 50 μm or less.

7. The copper strip for edgewise bending according to claim 1, wherein a concentration of Ag is in a range of 5 mass ppm or more and 20 mass ppm or less.

8. The copper strip for edgewise bending according to claim 1, wherein a concentration of His 10 mass ppm or less, a concentration of O is 500 mass ppm or less, a concentration of C is 10 mass ppm or less, and a concentration of S is 10 mass ppm or less.

9. The copper strip for edgewise bending according to claim 1, wherein the copper strip is a slit material of which the end face is a slit face.

10. A component for electric and electronic devices, which is produced by using the copper strip for edgewise bending according to claim 1.

11. A bus bar which is produced by using the copper strip for edgewise bending according to claim 1.

12. The bus bar according to claim 11, wherein a plating layer is provided on a current carrying portion.

13. The bus bar according to claim 11, wherein the bus bar includes an edgewise bent portion and an insulating coating portion.

* * * * *